United States Patent [19]

Miyamoto

[11] Patent Number: 5,293,042
[45] Date of Patent: Mar. 8, 1994

[54] SERVO CIRCUIT OF SCANNING PROBE MICROSCOPE

[75] Inventor: Hirofumi Miyamoto, Tokyo, Japan

[73] Assignee: Olympus Optical Co., Ltd., Tokyo, Japan

[21] Appl. No.: 875,358

[22] Filed: Apr. 29, 1992

[30] Foreign Application Priority Data

May 10, 1991 [JP] Japan .................. 3-105826
Dec. 19, 1991 [JP] Japan .................. 3-336967

[51] Int. Cl.⁵ ............................. H01J 37/26
[52] U.S. Cl. ........................ 250/306; 250/307
[58] Field of Search .......... 250/306, 307; 73/105; 318/560, 561, 592-594

[56] References Cited

U.S. PATENT DOCUMENTS

| | | | |
|---|---|---|---|
| 4,889,988 | 12/1989 | Elings et al. | 250/306 |
| 4,952,857 | 8/1990 | West et al. | 250/306 |
| 4,954,704 | 9/1990 | Elings et al. | 250/306 |
| 5,059,793 | 10/1991 | Miyamoto et al. | 250/306 |

Primary Examiner—Paul M. Dzierzynski
Assistant Examiner—Jim Beyer
Attorney, Agent, or Firm—Frishauf, Holtz, Goodman & Woodward

[57] ABSTRACT

An integrator for integrating a deviation signal and generating an integral control signal includes an operational amplifier for receiving a deviation signal through a first resistor, a capacitor connected between an inverting input terminal and an output terminal of the operational amplifier, and a series circuit constituted of a diode and a second resistor connected in parallel to the first resistor. If a probe and a sample approach each other and the deviation signal becomes is 0.7 V or more, charges are accumulated in the capacitor through the diode and second resistor as well as the first resistor. Thus, the voltage of the integral control signal is suddenly changed to the negative to separate the probe and sample from each other. If the probe and sample are separated from each other, the deviation signal becomes negative, and the charges are removed from the capacitor through the first resistor. The voltage of the integral control signal is thus changed to the positive to allow the probe and sample to approach each other. Since the diode prevents the charges from being removed through the second resistor, the change of the integral control signal to the positive is gentler than that of the integral control signal to the negative.

23 Claims, 5 Drawing Sheets

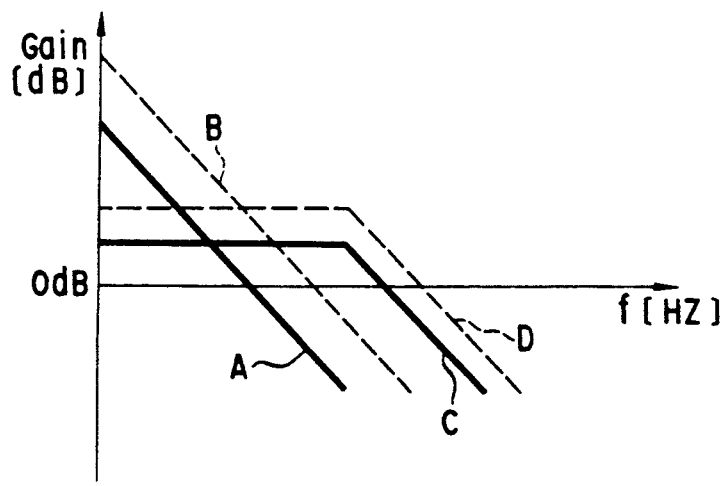
F I G. 3
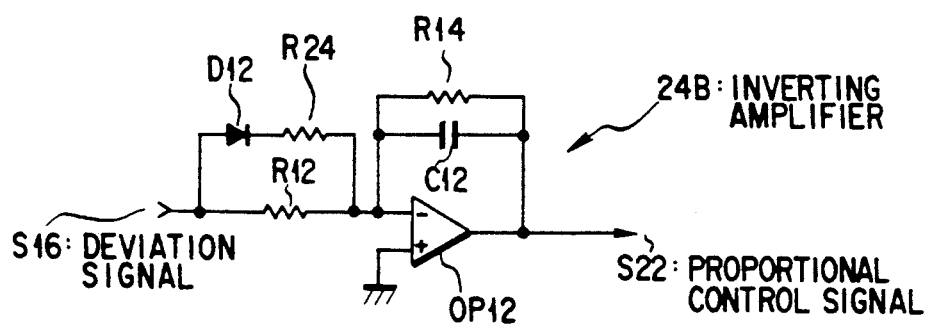
F I G. 4
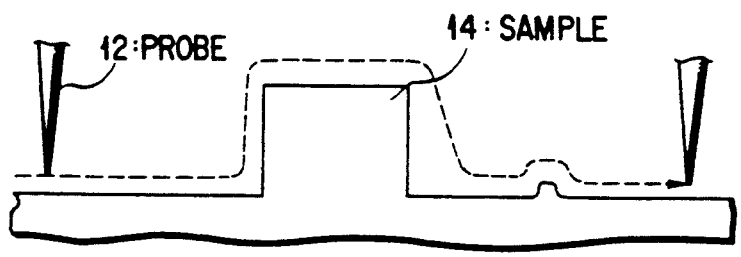
F I G. 5

SERVO CIRCUIT OF SCANNING PROBE MICROSCOPE

BACKGROUND OF THE INVENTION

1. Field of the Invention

The present invention generally relates to a scanning probe microscope such as a scanning tunnel microscope and an atomic force microscope and, more particularly, to a servo circuit for keeping a constant distance between a probe of the scanning probe microscope and a sample.

2. Description of the Related Art

A scanning probe microscope such as a scanning tunnel microscope (STM), an atomic force microscope (AFM), and a magnetic force microscope (MFM) has recently been used as a microscope having resolution on an atomic scale. The scanning probe microscope is disclosed in Elings et al., "Feedback Control for Scanning Tunnel Microscopes," U.S. Pat. No. 4,889,988 and in Elings et al., "Method to Increase the Speed of a Scanning Probe Microscope," U.S. Pat. No. 4,954,704.

A probe whose tip has a radius of about 100 nm, is brought close to a conductive sample at a distance of 1 nm. If a voltage of several volts is applied between the probe and sample in this state, tunnel current of several nanoamperes flows between one of the atoms of the tip of the probe and one of the atoms of the sample which is the closest to the tip. The tunnel current reduces logarithmically as the distance between the probe and sample increases. The STM, which makes use of this phenomenon, causes the probe to scan the surface of the sample, and then outputs atomic arrangement of the surface of the sample as an image in accordance with an amount of the flowing tunnel current.

In the STM, generally, a piezoelectric device for driving the sample or probe is controlled by the output of a tunnel current servo circuit to keep the distance between the sample and probe constant in accordance with irregularities of the surface of the sample when the probe scans the surface of the sample.

At the beginning of development of the STM, its feature was that atomic arrangement could be observed in a sample having a simple atomic structure such as carbon and silicon. The servo technique of the STM allows a three-dimensional image to be formed from the pit structure of an optical disk serving as a sample having a nm-scale structure. The servo technique has an advantage which cannot be obtained from optical microscopes or electron microscopes.

There is a great demand that a scanning range of a probe be widened up to several square micrometers in a sample having a nm-scale structure. Further, the probe is greatly moved in its up-and-down direction (Z direction).

If, however, time required for forming one image of an STM is several tens of seconds which is equal to that required for forming that of a conventional STM, a relative speed of the probe of the STM has to be several tens of times as high as that of the probe of the conventional STM. To correctly respond to the irregularities of the surface of the sample, the cut-off frequency of the response of the servo circuit has to be heightened.

If there is a change in the movement of the probe in the up-and-down direction or there are great undulations on the sample, a high-speed response is required. If the high-speed response is not performed, the probe will collide with the undulations on the sample. Since the piezoelectric device used in a mechanism for slightly moving the probe of the STM has its natural frequency, if the band of a servo gain is easily broadened, the piezoelectric device resonates and the servo circuit will be made unstable.

The above is true of all scanning probe microscopes such as the AFM and MFM.

SUMMARY OF THE INVENTION

The present invention has been made in consideration of the above situation and its object is to provide a servo circuit of a scanning probe microscope capable of scanning a sample at relatively high speed so as not to damage the probe or sample by moving the probe in the up-and-down direction in response to great undulations on the sample.

To attain the above object, there is provided a servo circuit of a scanning probe microscope according to the present invention, the scanning probe microscope outputting a three-dimensional image in response to a scanning output signal generated when a probe relatively scans a surface of a sample in a direction parallel thereto, the servo circuit keeping a distance between the probe and the sample constant when the probe scans the surface of the sample, and comprising:

moving means for relatively moving the probe in a direction perpendicular to the surface of the sample;

deviation detecting means for detecting a deviation from a reference value of the scanning output signal and generating a deviation signal;

control means for generating a drive signal corresponding to the deviation signal and supplying the drive signal to the moving means, thereby moving the probe; and servo characteristic changing means for detecting a direction in which the scanning output signal is suddenly increased, in response to the deviation signal, and greatly changing the drive signal generated from the control means only at a moment when the direction is detected.

In the servo circuit of the scanning probe microscope according to the present invention, the servo characteristic is improved by incorporating an element such as a diode having a current directional property into a feedback element in a direction in which the level of tunnel current or cantilever displacement detection signal is increased so as to heighten a servo gain in response to the movement of the probe in the up-and-down direction, especially great undulations on a sample. When the probe scans the surface of the sample at relatively high speed, the level of the tunnel current or cantilever displacement detection signal is usually stabilized by a predetermined servo gain and gently changed. However, when the probe approaches a great undulation of the sample, the level of the tunnel current or detection signal is suddenly increased. A servo output is increased in level at the moment when a direction in which the level of the tunnel current or detection signal is increased is detected, with the result that the probe and sample are separated from each other. Consequently, the probe can scan the sample at relatively high speed without damaging the probe or sample, since the probe can be moved in the up-and-down direction in response to especially great undulations on the sample.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a graph showing gain-frequency characteristics of the servo circuits according to the first and second embodiments of the present invention;

FIG. 4 is a circuit diagram of an inverting amplifier of a controller of the servo circuit according to the second embodiment of the present invention;

FIG. 5 is a view showing a trace of a probe formed when the probe scans a sample having irregularities at high speed by means of a controller of a servo circuit according to a third embodiment of the present invention;

DETAILED DESCRIPTION OF THE PREFERRED EMBODIMENTS

Embodiments of the present invention will now be described, with reference to the accompanying drawings.

Figure 1:
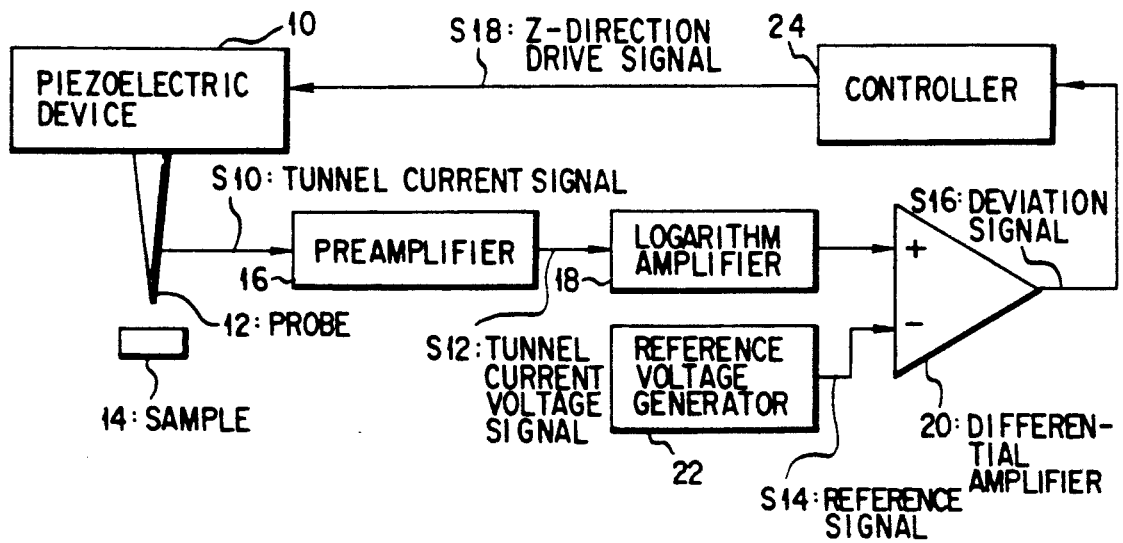
FIG. 1 is a block diagram of a servo circuit of a scanning tunnel microscope according to a first embodiment of the present invention.

FIG. 1 is a block diagram of a servo circuit of a scanning tunnel microscope (STM) according to a first embodiment of a scanning probe microscope of the present invention.

A piezoelectric device 10 is a Z-direction slightly moving mechanism which is contracted in the Z direction by applying a positive voltage thereto. A probe 12 for supplying tunnel current to a sample 14 is attached to the end of the piezoelectric device 10. A tunnel current signal S10 generated from the probe 12 is I/V-converted into a tunnel current voltage signal S12 by a preamplifier 16. The tunnel current voltage signal S12 is logarithmically converted into a voltage signal by a logarithm amplifier 18. The voltage signal is input to a non-inverting input terminal of a differential amplifier 20. A reference signal S14 is supplied from a reference voltage generator 22 to an inverting input terminal of the differential amplifier 20. The differential amplifier 20 outputs a positive signal as a deviation signal S16 when the voltage signal corresponding to the tunnel current is higher than the reference signal S14, that is, when the probe 12 approaches the sample 14 too much. The deviation signal S16 is then input to a controller 24. When the deviation signal S16 is positive, the controller 24 increases the voltage of a Z-direction drive signal S18 output therefrom to the positive to contract the piezoelectric device 10. Therefore, the probe 12 separates from the sample 14, and the voltage corresponding to the tunnel current approaches the reference signal S14.

Figure 2:
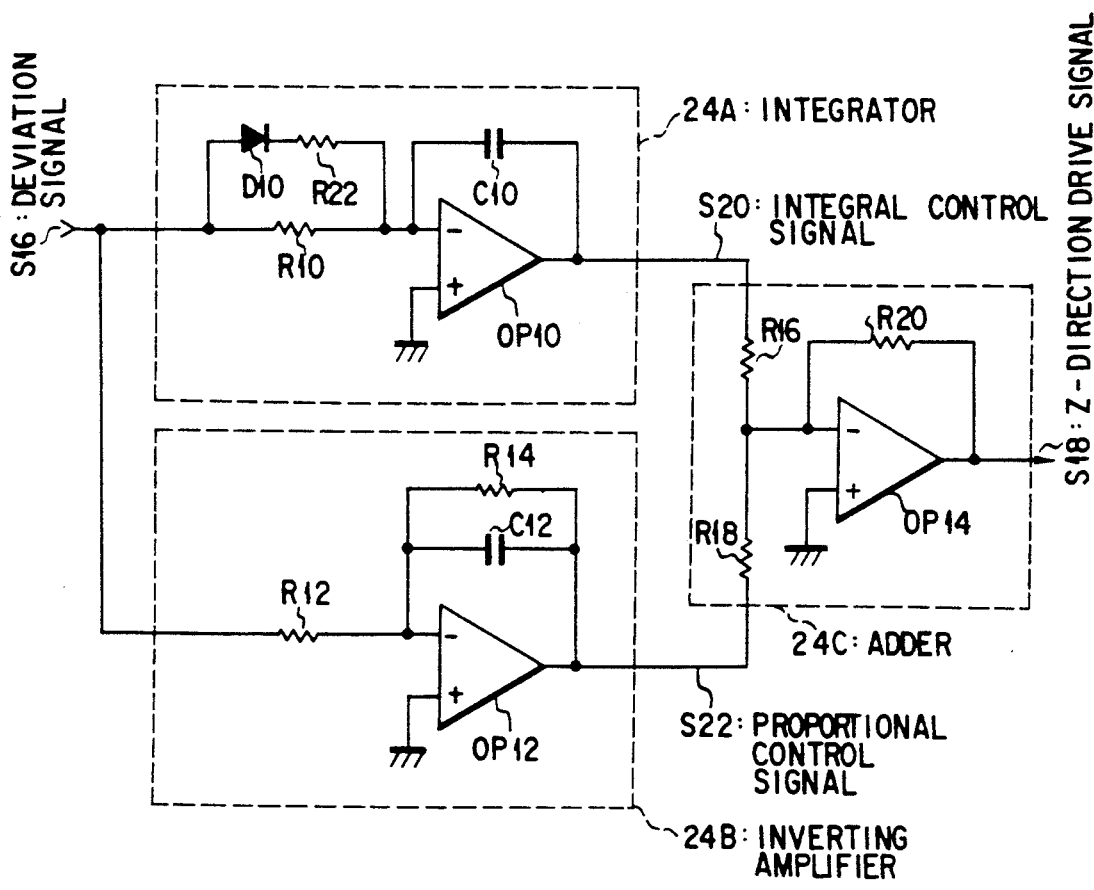
FIG. 2 is a detailed circuit diagram of a controller of the servo circuit shown in FIG. 1.

As shown in FIG. 2, the controller 24 includes a proportional-pulse-integral control circuit having an integrator 24A, an inverting amplifier 24B, and an adder 24C. The integrator 24A integrates the deviation signal S16 output from the differential amplifier 20, and then outputs an integral control signal S20. The inverting amplifier 24B inverting-amplifies the deviation signal S16 and outputs a proportional control signal S22. The adder 24C adds the integral control signal S20 and proportional control signal S22 to output the Z-direction drive signal S18.

The integrator 24A includes an operational amplifier OP10, a resistor R10, and a capacitor C10. An inverting input terminal of the operational amplifier OP10 is supplied with the deviation signal S16 from the differential amplifier 20 through the resistor R10. A non-inverting input terminal of the operational amplifier OP10 is connected to a reference voltage terminal. An output of the operational amplifier OP10 is supplied to the adder 24C as the integral control signal S20. The capacitor C10 is connected between the inverting input terminal and output terminal of the operational amplifier OP10.

The inverting amplifier 24B includes an operational amplifier OP12, resistors R12 and R14, and a capacitor C12. An inverting input terminal of the operational amplifier OP12 is supplied with the deviation signal S16 from the differential amplifier 20 through the resistor R12. A non-inverting input terminal of the operational amplifier OP12 is connected to the reference voltage terminal. An output of the operational amplifier OP12 is supplied to the adder 24C as the proportional control signal S22. The capacitor C12 is connected between the inverting input terminal and output terminal of the operational amplifier OP12, and the resistor R14 is connected in parallel to the capacitor C12.

The adder 24C includes an operational amplifier OP14 and resistors R16, R18, and R20. An inverting input terminal of the operational amplifier OP14 is supplied with the integral control signal S20 from the integrator 24A through the resistor R16 and also supplied with the proportional control signal S22 from the inverting amplifier 24B through the resistor R18. A non-inverting terminal of the operational amplifier OP14 is connected to the reference voltage terminal. An output of the operational amplifier OP14 is supplied to the piezoelectric device 10 as the Z-direction drive signal S18. The resistor R20 is connected between the inverting input terminal and output terminal of the operational amplifier OP14.

The servo circuit according to the first embodiment is characterized in that a series circuit of a diode D10 and a resistor R22 is connected in parallel with the resistor R10 of the integrator 24A of the controller 24.

In the above arrangement of the servo circuit, the deviation signal S16 is changed to a positive voltage if the probe 12 approaches the sample 14 over a predetermined position. When the deviation signal S16 has a voltage of 0.7 V or more, the capacitor C10 is charged through the resistor R10 in the integrator 24A, and also charged through the diode D10 and resistor R22. Thus, the voltage of the integral control signal S20 is suddenly changed to a negative voltage to separate the probe 12 from the sample 14.

On the contrary, the deviation signal S16 is changed to a negative voltage if the probe 12 separates from the sample 14 over a predetermined position. In the integrator 24A, the capacitor C10 is discharged through the resistor R10, the voltage of the integral control signal S20 is changed to a positive voltage to bring the probe 12 close to the sample 14. Since the diode D10 prevents the capacitor C10 from being discharged through the resistor R22, the change of the integral control signal S20 to the positive voltage is gentler than that of the signal S20 to the negative voltage. In other words, the movement of separating the probe 12 from the sample 14 is quick, and that of bringing the probe 12 close to the sample 14 is slow.

FIG. 3 shows the gain-frequency characteristics of the servo circuit having the arrangement shown in FIG. 2. In FIG. 3, a line A indicates the gain-frequency characteristics in the direction in which the probe approaches the sample, and a dotted line B indicates the gain-frequency characteristics in the direction in which the probe separates from the sample. As the value of the resistor R22 becomes small, the line B moves upward in FIG. 3, and the gain increases.

FIG. 4 shows an inverting amplifier of a controller of the servo circuit according to the second embodiment of the present invention. The second embodiment is characterized in that a series circuit of a diode D12 and a resistor R24 is connected in parallel with the resistor R12 of the inverting amplifier 24B instead of arranging a series circuit of the diode and resistor in the integrator 24A shown in FIG. 2.

In the arrangement of the servo circuit according to the second embodiment, the deviation signal S16 is changed to a positive voltage if the probe 12 approaches the sample 14 over a predetermined position. When the deviation signal S16 has a voltage of 0.7 V or more, current flows to the resistor R14 through the diode D12 and resistor R24 in addition to current flowing to the resistor R14 through the resistor R12 in the inverting amplifier 24B. Thus, the voltage of the proportional control signal S22 is suddenly changed to a negative voltage to separate the probe 12 from the sample 14.

On the contrary, the deviation signal S16 is changed to a negative voltage if the probe 12 separates from the sample 14 over a predetermined position. In the inverting amplifier 24B, current flows from the resistor R14 to the resistor R12, and the voltage of the proportional control signal S22 is changed to a positive voltage to bring the probe 12 close to the sample 14. Since the diode D12 prevents the current from flowing from the resistor R14 to the resistor R24, the change of the proportional control signal S22 to the positive voltage is gentler than that of the signal S22 to the negative voltage. In other words, the movement of separating the probe 12 from the sample 14 is quick, and that of bringing the probe 12 close to the sample 14 is slow.

In FIG. 3, a curved line C indicates the gain-frequency characteristics in the direction in which the probe approaches the sample, and a dotted curved line D indicates the gain-frequency characteristics in the direction in which the probe separates from the sample. As the value of the resistor R24 of the inverting amplifier 24B becomes small, the line D moves upward in FIG. 3, and the gain increases.

FIG. 5 shows a trace of the probe 12 formed when the sample 14 having irregularities is scanned at high speed in the controller 24 of the servo circuit according to the third embodiment of the present invention. In the third embodiment, both the arrangements of the servo circuit according to the first and second embodiments are used and, more specifically, a series circuit of the diode D10 and resistor R22 is arranged in the integrator 24A and a series circuit of the diode D12 and resistor R24 is arranged in the inverting amplifier 24B. In the third embodiment, as shown in FIG. 5, the probe can react to a great undulation on the sample by virtue of the effect of the first embodiment, and it can also react to a slight undulation on the sample by virtue of the effect of the second embodiment, without a delay in phase.

Figure 6:
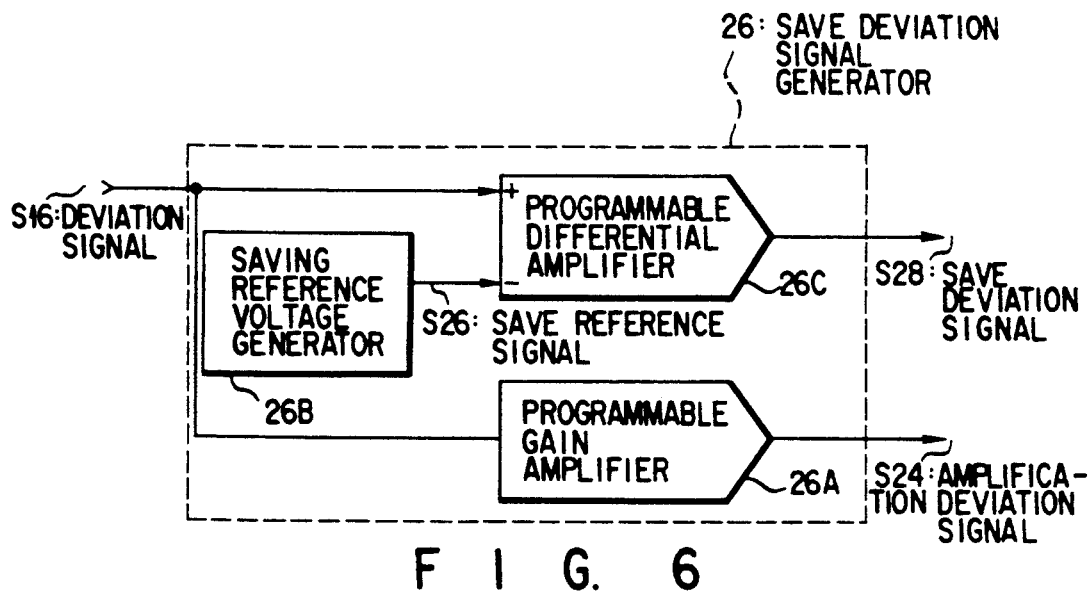
FIG. 6 is a block diagram of a save signal generator applied to a servo circuit according to a fourth embodiment of the present invention.

FIG. 6 is a block diagram of a save (or refuge) deviation signal generator 26 applied to the servo circuit according to the fourth embodiment of the present invention. This circuit 26 aims at switching the gains between normal servomechanism and servomechanism for raising the probe 12.

Figure 7A:
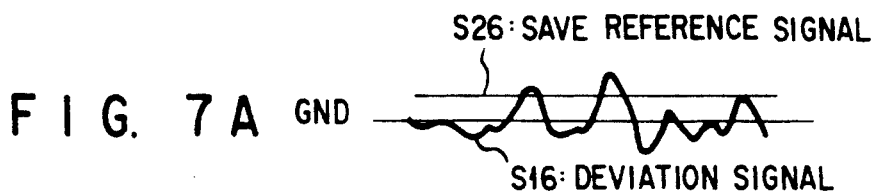
FIGS. 7A to 7C are views of signal waveforms of respective components of the save signal generator shown in FIG. 6.
Figure 7B:
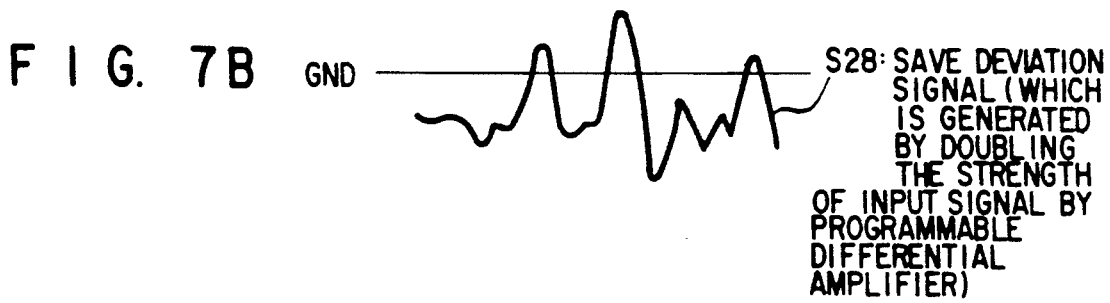
Figure 7C:
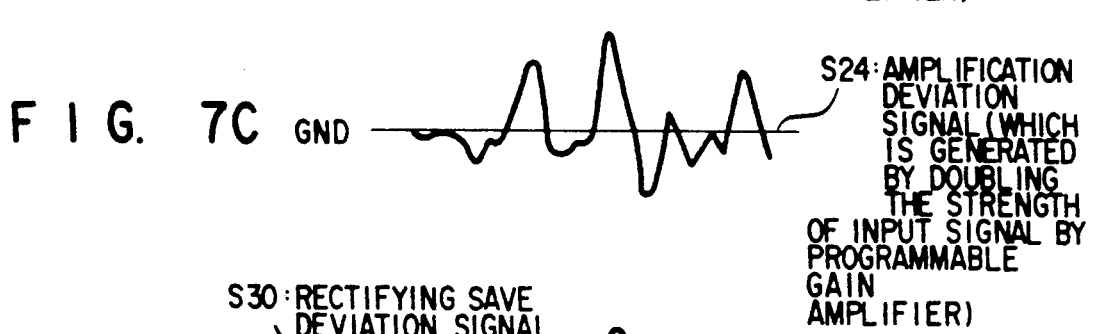

The save deviation signal generation circuit 26 includes a system in which the deviation signal S16 shown in FIG. 1 is input, and amplified by a programmable gain amplifier 26A to output an amplification deviation signal S24, and a system in which the deviation signal S16 and save (or refuge) reference signal S26 generated from a save reference voltage generator 26B are differentially amplified by a programmable differential amplifier 26C to output a save deviation signal S28. The waveforms of these signals S16, S24, S26, and S28 are shown in FIGS. 7A to 7C.

Figure 8:
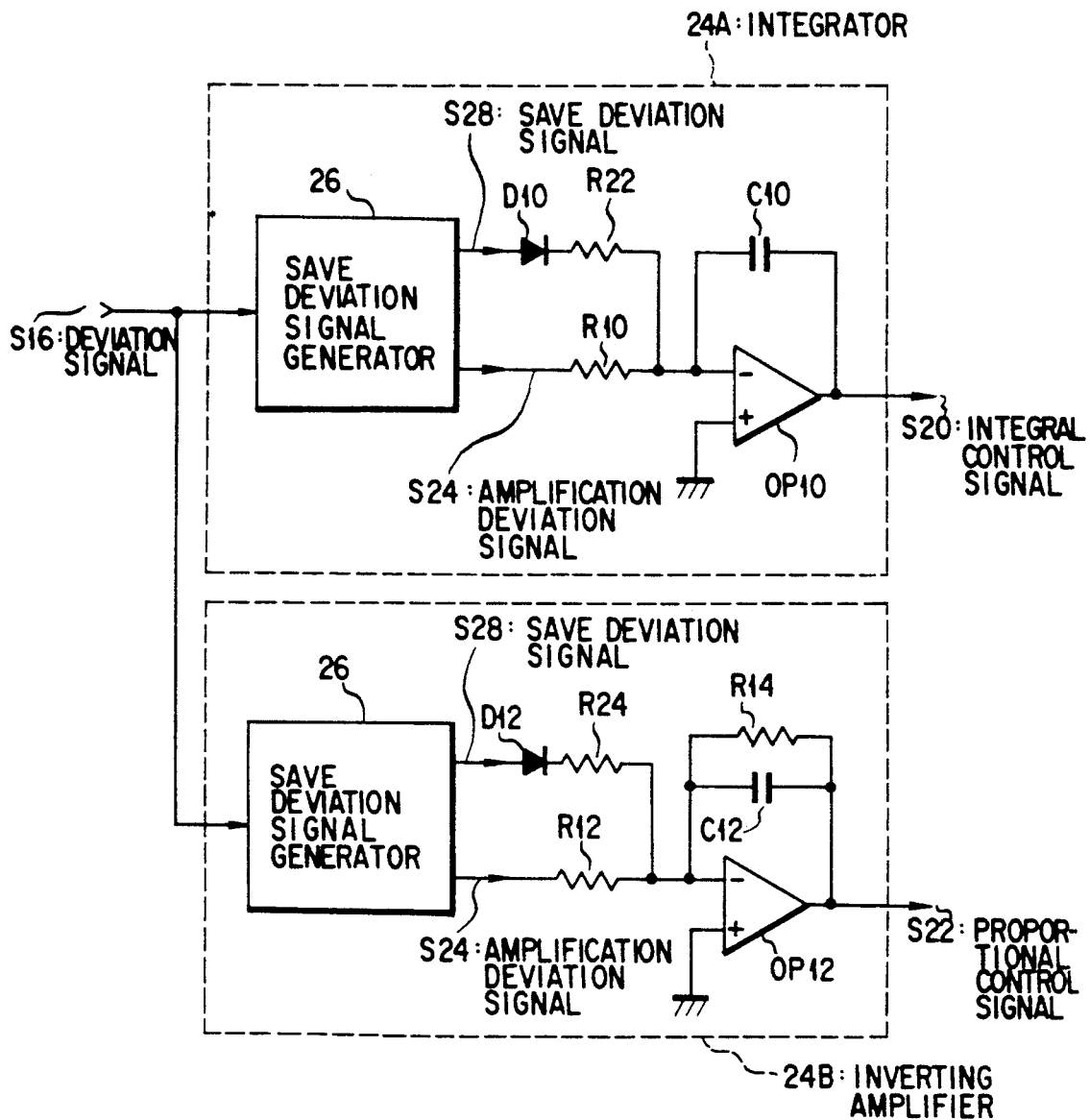
FIG. 8 is a block diagram of an integrator and an inverting amplifier of a controller of the servo circuit according to the fourth embodiment of the present invention.

FIG. 8 shows the integrator 24A and inverting amplifier 24B each including the save deviation signal generator 26 having the above arrangement. In the fourth embodiment of the present invention, as shown in FIG. 8, the amplification deviation signal S24 and save deviation signal S28 generated from the save deviation signal generator 26 are supplied in response to the deviation signal S16, instead of directly supplying the deviation signal S16 to the resistors R10 and R12 and diodes D10 and D12 as in the third embodiment.

Figure 9:
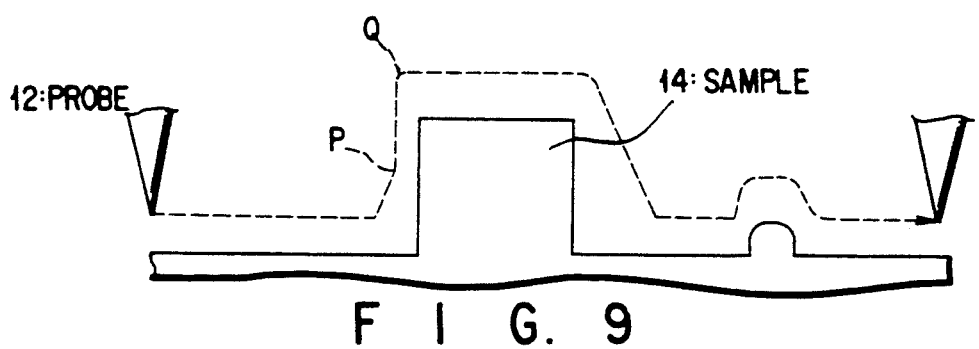
FIG. 9 is a view showing a trace of a probe formed when the probe scans a sample having irregularities at high speed by means of the controller of the servo circuit according to the fourth embodiment.

When the STM performs a scanning operation by the controller 24 in which the integrator 24A and inverting amplifier 24B are arranged in parallel, the trace of the probe 12 is expressed as shown in FIG. 9. In FIG. 9, since the level of the deviation signal S16 is higher than that of the save reference signal S26, and the servo gain in the save (or refuge) direction is increased in the interval between points P and Q, the probe 12 does not collide with the sample 14 but scans it.

Figure 7D:
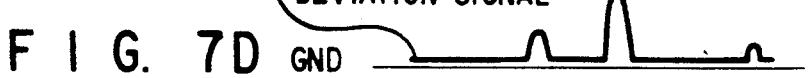
FIG. 7D is a view of an output waveform of a half-wave rectifier shown in FIG. 10.
Figure 10:
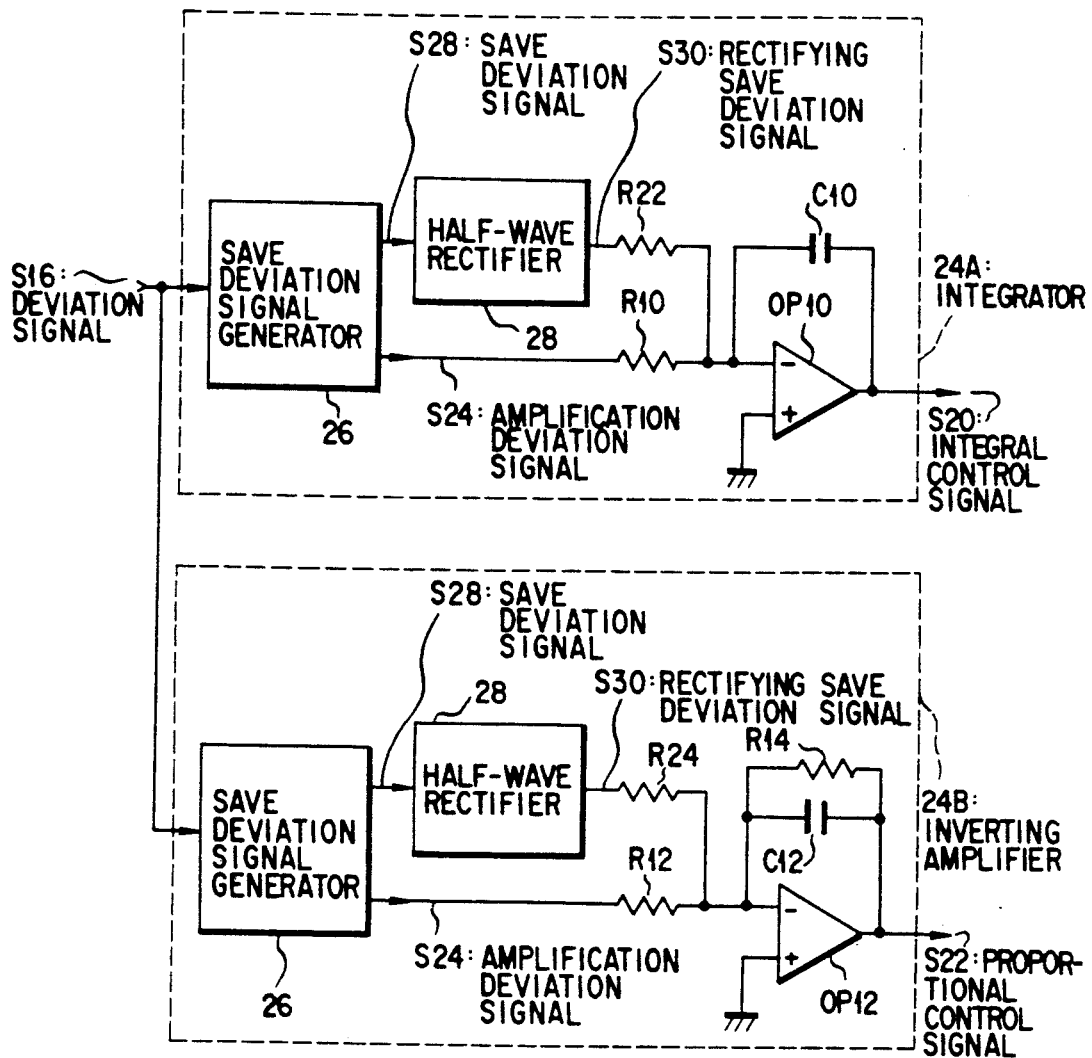
FIG. 10 is a block diagram of an integrator and an inverting amplifier of a controller of a servo circuit according to a fifth embodiment of the present invention.

FIG. 10 is a block diagram showing the constitutions of the integrator 24A and inverting amplifier 24B of the controller 24 of the servo circuit according to the fifth embodiment of the present invention. In the fifth embodiment, the first and second diodes D1 and D2 in the fourth embodiment are replaced with a half-wave rectifier 28. If the STM performs a scanning operation by the controller 24 including the adder 24C as well as the integrator 24A and inverting amplifier 24B, the same effect as that of the fourth embodiment can be obtained from the fifth embodiment. A rectifying save deviation signal S30 output from the half-wave rectifier 28 is expressed as shown in FIG. 7D when the deviation signal S16 is input as shown in FIG. 7A.

Figure 11:
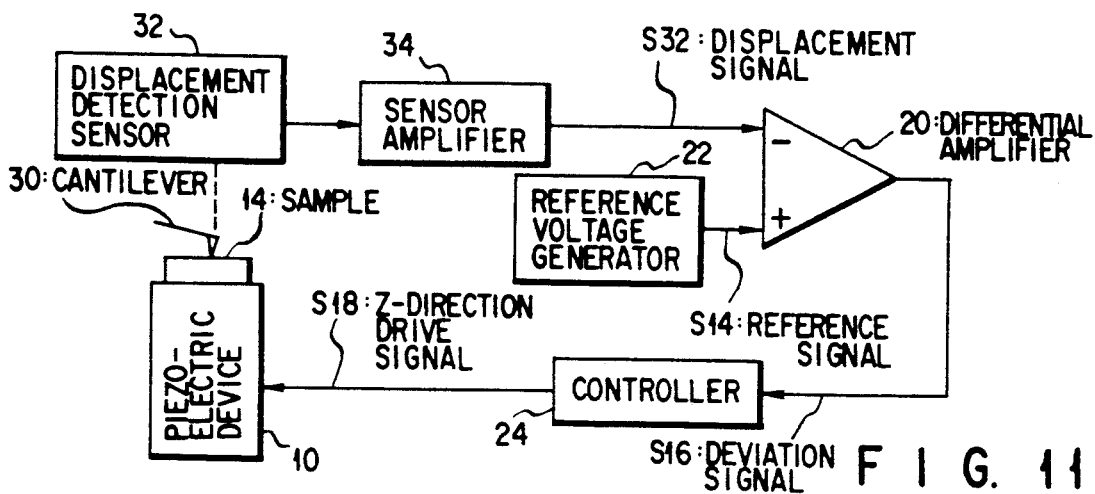
FIG. 11 is a block diagram of a servo circuit of an atomic force microscope according to a sixth embodiment of the present invention.

The present invention is not limited to the STM described above. FIG. 11 is a block diagram of a servo circuit of an atomic force microscope (AFM) according to a sixth embodiment of the present invention. As shown in FIG. 11, a cantilever 30 has a sharp probe (tip) on its free end. When the probe relatively scans the surface of the sample 14, it is elastically displaced by the force exerted between the probe and sample 14. The displacement of the cantilever 30 is detected by a displacement detection sensor 32, an output of the sensor 32 is converted by a sensor amplifier 34 into a displacement signal S32 and then supplied to the non-inverting input terminal of the differential amplifier 20. The inverting input terminal of the differential amplifier 20 is supplied with the reference signal S14 output from the reference voltage generator 22. When the level of the displacement signal S32 is higher than a reference value, in other words, when the probe of the cantilever 30 comes too close to the sample 14, the deviation signal S16 output from the differential amplifier 20 becomes positive. The positive deviation signal S16 is supplied to the controller 24 of the first to fifth embodiments. As described above, when the deviation signal S16 is positive, the controller 24 causes the voltage of the Z-direction drive signal S18 output from the controller 24 to increase to positive to contract the piezoelectric device 10. The probe and the sample 14 are therefore separated from each other.

The present invention can also be applied to a servo circuit of a magnetic force microscope (MFM) using a ferromagnetic probe made of iron, nickel foil or the like, for detecting magnetic force exerted between a magnetic sample and a probe to observe the surface of the magnetic sample with high resolution. Further, the present invention can be applied to various scanning probe microscopes.

As described above, since the servo circuit is so designed that the gain in the direction in which the sample and probe are separated from each other is set higher than that in the direction in which the sample and probe are put close to each other, a high-speed scanning operation can be performed without colliding the probe and sample with each other.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A servo circuit of a scanning probe microscope for outputting a three-dimensional image in response to a scanning output signal generated when a probe relatively scans a surface of a sample in a direction parallel thereto, said servo circuit keeping a distance between the probe and the sample constant when the probe scans the surface of the sample, and comprising:

moving means for relatively moving the probe in a direction perpendicular to the surface of the sample;

deviation detecting means for detecting a deviation from a reference value of the scanning output signal and generating a deviation signal;

control means for:
   receiving the deviation signal from said deviation detecting means,
   generating a drive signal corresponding to the deviation signal and possessing a predetermined response characteristic to the deviation signal, and
   supplying the drive signal to said moving means, thereby moving the probe; and servo characteristic changing means for:
   receiving the deviation signal from said deviation detecting means,
   detecting an excess of a value of the deviation signal over a predetermined value, and
   changing the predetermined response characteristic to the deviation signal, possessed by the drive signal generated from said control means, in response to the excess being detected, to a faster response characteristic.

2. The servo circuit according to claim 1, wherein said scanning probe microscope includes a scanning tunnel microscope for causing the probe to relatively scan the surface of the sample in the direction parallel thereto, and outputting a three-dimensional image based on tunnel current flowing between the probe and the sample when the probe relatively scans the surface of the sample;

said deviation detecting means detects a deviation from a reference value of the tunnel current flowing from the probe, and outputs a deviation signal; and said servo characteristic changing means includes tunnel current corresponding characteristic changing means for detecting an excess of a value of the deviation signal over said predetermined value, and for changing the predetermined response characteristic to the deviation signal, possessed by the drive signal generated from said control means, in response to the excess being detected, to a faster response characteristic.

3. The servo circuit according to claim 2, wherein said control means includes:

integrator means for integrating the deviation signal output from said deviation detection means and generating an integral control signal;

inverting amplifier means for inverting-amplifying the deviation signal output from said deviation detecting means and generating a proportional control signal; and adder means for adding the integral control signal generated from said integrator means and the proportional control signal generated from said inverting amplifier means and generating the drive signal, and said tunnel current corresponding characteristic changing means includes an element having a current directional property connected in at least one of said integrator means and said inverting amplifier means.

4. The servo circuit according to claim 3, wherein said integrator means includes:
an operational amplifier having an inverting input terminal for receiving the deviation signal from said deviation detecting means through a first resistor, a non-inverting input terminal connected to a reference voltage terminal, and an output terminal for supplying the integral control signal to said adder means; and
a capacitor connected between the inverting input terminal and the output terminal of said operational amplifier, and
said tunnel current corresponding characteristic changing means includes a series circuit formed of the element having the current directional property and a second resistor and connected in parallel to said first resistor, said element having the current directional property including a diode having an anode connected to one end of said first resistor to receive the deviation signal from said deviation detecting means, and a cathode connected to one end of said second resistor.

5. The servo circuit according to claim 3, wherein said inverting amplifier means includes:
an operational amplifier having an inverting input terminal for receiving the deviation signal from said deviation detecting means through a first resistor, a non-inverting input terminal connected to a reference voltage terminal, and an output terminal for supplying the proportional control signal to said adder means;
a capacitor connected between the inverting input terminal and the output terminal of said operational amplifier; and
a second resistor connected in parallel to said capacitor, and
said tunnel current corresponding characteristic changing means includes a series circuit formed of the element having the current directional property and a third resistor and connected in parallel to said first resistor, said element having the current directional property including a diode having an anode connected to one end of said first resistor to receive the deviation signal from said deviation detecting means, and a cathode connected to one end of said third resistor.

6. The servo circuit according to claim 3, wherein said integrator means includes:
a first operational amplifier having an inverting input terminal for receiving the deviation signal from said deviation detecting means through a first resistor, a non-inverting input terminal connected to a reference voltage terminal, and an output terminal for supplying the integral control signal to said adder means; and
a first capacitor connected between the inverting input terminal and the output terminal of said first operational amplifier,
said inverting amplifier means includes:
a second operational amplifier having an inverting input terminal for receiving the deviation signal from said deviation detecting means through a second resistor, a non-inverting input terminal connected to the reference voltage terminal, and an output terminal for supplying the proportional control signal to said adder means;
a second capacitor connected between the inverting input terminal and the output terminal of said second operational amplifier; and
a third resistor connected in parallel to said second capacitor, and
said tunnel current corresponding characteristic changing means includes:
a first series circuit formed of a first diode serving as an element having the current directional property and a fourth resistor and connected in parallel to said first resistor, said first diode having an anode connected to one end of said first resistor to receive the deviation signal from said deviation detecting means and a cathode connected to one end of said fourth resistor; and
a second series circuit formed of a second diode serving as an element having the current directional property and a fifth resistor and connected in parallel to said second resistor, said second diode having an anode connected to one end of said second resistor to receive the deviation signal from said deviation detecting means and a cathode connected to one end of said fifth resistor.

7. The servo circuit according to claim 3, wherein said integrator means includes:
a save deviation signal generator means for generating an amplification deviation signal by amplifying the deviation signal from said deviation detecting means with a programmable gain, and generating a save deviation signal by differentially amplifying the deviation signal and a reference signal with a programmable gain;
an operational amplifier having an inverting input terminal for receiving the amplification deviation signal from said save deviation signal generator means through a first resistor, a non-inverting input terminal connected to a reference voltage terminal, and an output terminal for supplying the integral control signal to said adder means; and
a capacitor connected between the inverting input terminal and the output terminal of said operational amplifier, and
said tunnel current corresponding characteristic changing means includes:
a diode having an anode and a cathode and serving as an element having the current directional property, said anode being connected to said save deviation signal generator means to receive the save deviation signal therefrom; and
a second resistor whose one end is connected to the cathode of said diode and whose other end is connected to the non-inverting input terminal of said operational amplifier.

8. The servo circuit according to claim 3, wherein said inverting amplifier means includes:
a save deviation signal generator means for generating an amplification deviation signal by amplifying the deviation signal from said deviation detecting means with a programmable gain, and generating a save deviation signal by differentially amplifying the deviation signal and a reference signal with a programmable gain;
an operational amplifier having an inverting input terminal for receiving the amplification deviation signal from said save deviation signal generator means through a first resistor, a non-inverting input terminal connected to a reference voltage terminal, and an output terminal for supplying the proportional control signal to said adder means;

a capacitor connected between the inverting input terminal and the output terminal of said operational amplifier; and a second resistor connected in parallel to said capacitor, and said tunnel current corresponding characteristic changing means includes:

a diode having an anode and a cathode and serving as an element having the current directional property, said anode being connected to said save deviation signal generator means to receive the save deviation signal therefrom; and a third resistor whose one end is connected to the cathode of said diode and whose other end is connected to the non-inverting input terminal of said operational amplifier.

9. The servo circuit according to claim 3, wherein said integrator means includes:

first save deviation signal generator means for generating a first amplification deviation signal by amplifying the deviation signal from said deviation detecting means with a programmable gain, and generating a first save deviation signal by differentially amplifying the deviation signal and a first reference signal with a programmable gain;

a first operational amplifier having an inverting input terminal for receiving the first amplification deviation signal from said first save deviation signal generator means through a first resistor, a non-inverting input terminal connected to a reference voltage terminal, and an output terminal for supplying the integral control signal to said adder means; and a first capacitor connected between the inverting input terminal and the output terminal of said first operational amplifier, said inverting amplifier means includes:

second save deviation signal generator means for generating a second amplification deviation signal by amplifying the deviation signal from said deviation detecting means with a programmable gain, and generating a second save deviation signal by differentially amplifying the deviation signal and a second reference signal with a programmable gain;

a second operational amplifier having an inverting input terminal for receiving the second amplification deviation signal from said second save deviation signal generator means through a second resistor, a non-inverting input terminal connected to the reference voltage terminal, and an output terminal for supplying the proportional control signal to said adder means;

a second capacitor connected between the inverting input terminal and the output terminal of said second operational amplifier; and a third resistor connected in parallel to said second capacitor, and said tunnel current corresponding characteristic changing means includes:

a first diode having an anode and a cathode and serving as an element having the current directional property, said anode being connected to said first save deviation signal generator means to receive the first save deviation signal therefrom;

a fourth resistor whose one end is connected to the cathode of said first diode and whose other end is connected to the non-inverting input terminal of said first operational amplifier;

a second diode having an anode and a cathode and serving as an element having the current directional property, said anode being connected to said second save deviation signal generator means to receive the second save deviation signal therefrom; and a fifth resistor whose one end is connected to the cathode of said second diode and whose other end is connected to the non-inverting input terminal of said second operational amplifier.

10. The servo circuit according to claim 2, wherein said control means includes:

integrator means for integrating the deviation signal output from said deviation detection means and generating an integral control signal;

inverting amplifier means for inverting-amplifying the deviation signal output from said deviation detecting means and generating a proportional control signal; and adder means for adding the integral control signal generated from said integrator means and the proportional control signal generated from said inverting amplifier means and generating the drive signal, said integrator means includes:

save deviation signal generator means for generating an amplification deviation signal by amplifying the deviation signal from said deviation detecting means with a programmable gain, and generating a save deviation signal by differentially amplifying the deviation signal and a reference signal with a programmable gain;

an operational amplifier having an inverting input terminal for receiving the amplification deviation signal from said save deviation signal generator means through a first resistor, a non-inverting input terminal connected to a reference voltage terminal, and an output terminal for supplying the integral control signal to said adder means; and a capacitor connected between the inverting input terminal and the output terminal of said operational amplifier, and said tunnel current corresponding characteristic changing means includes:

half-wave rectifier means for half-wave-rectifying the save deviation signal generated from said save deviation signal generator means and generating a rectified save deviation signal; and a second resistor connected between said half-wave rectifier means and the non-inverting input terminal of said operational amplifier.

11. The servo circuit according to claim 2, wherein said control means includes:

integrator means for integrating the deviation signal output from said deviation detection means and generating an integral control signal;

inverting amplifier means for inverting-amplifying the deviation signal output from said deviation detecting means and generating a proportional control signal; and adder means for adding the integral control signal generated from said integrator means and the proportional control signal generated from said inverting amplifier means and generating the drive signal, said inverting amplifier means includes:

save deviation signal generator means for generating an amplification deviation signal by amplifying the deviation signal from said deviation detecting means with a programmable gain, and generating a save deviation signal by differentially amplifying the deviation signal and a reference signal with a programmable gain;

an operational amplifier having an inverting input terminal for receiving the amplification deviation signal from said save deviation signal generator means through a first resistor, a non-inverting input terminal connected to a reference voltage terminal, and an output terminal for supplying the proportional control signal to said adder means;

a capacitor connected between the inverting input terminal and the output terminal of said operational amplifier; and a second resistor connected in parallel to said capacitor, and said tunnel current corresponding characteristic changing means includes:

half-wave rectifier means for half-wave-rectifying the save deviation signal generated from said save deviation signal generator means and generating a rectified save deviation signal; and a third resistor connected between said half-wave rectifier means and the non-inverting input terminal of said operational amplifier.

12. The servo circuit according to claim 2, wherein said control means includes:

integrator means for integrating the deviation signal output from said deviation detection means and generating an integral control signal;

inverting amplifier means for inverting-amplifying the deviation signal output from said deviation detecting means and generating a proportional control signal; and adder means for adding the integral control signal generated from said integrator means and the proportional control signal generated from said inverting amplifier means and generating the drive signal, said integrator means includes:

first save deviation signal generator means for generating a first amplification deviation signal by amplifying the deviation signal from said deviation detecting means with a programmable gain, and generating a first save deviation signal by differentially amplifying the deviation signal and a first reference signal with a programmable gain;

a first operational amplifier having an inverting input terminal for receiving the first amplification deviation signal from said first save deviation signal generator means through a first resistor, a non-inverting input terminal connected to a reference voltage terminal, and an output terminal for supplying the integral control signal to said adder means; and a first capacitor connected between the inverting input terminal and the output terminal of said first operational amplifier, said inverting amplifier means includes:

second save deviation signal generator means for generating a second amplification deviation signal by amplifying the deviation signal from said deviation detecting means with a programmable gain, and generating a second save deviation signal by differentially amplifying the deviation signal and a second reference signal with a programmable gain;

a second operational amplifier having an inverting input terminal for receiving the second amplification deviation signal from said second save deviation signal generator means through a second resistor, a non-inverting input terminal connected to the reference voltage terminal, and an output terminal for supplying the proportional control signal to said adder means;

a second capacitor connected between the inverting input terminal and the output terminal of said second operational amplifier; and a third resistor connected in parallel to said second capacitor, and said tunnel current corresponding characteristic changing means includes:

first half-wave rectifier means for half-wave-rectifying the first save deviation signal generated from said first save deviation signal generator means and generating a first rectified save deviation signal;

a fourth resistor connected between said first half-wave rectifier means and the non-inverting input terminal of said first operational amplifier;

second half-wave rectifier means for half-wave-rectifying the second save deviation signal generated from said second save deviation signal generator means and generating a second rectified save deviation signal; and a fifth resistor connected between said second half-wave rectifier means and the non-inverting input terminal of said second operational amplifier.

13. The servo circuit according to claim 1, wherein said scanning probe microscope includes an atomic force microscope having the probe which is sharpened at its free end, for detecting a displacement of a cantilever elastically displaced by force exerted between the probe and the sample when the probe relatively scans the surface of the sample, generating a displacement detection signal corresponding to the displacement of the cantilever, and forming a three-dimensional image in response to the displacement detection signal;

said deviation detecting means detects a deviation from a reference value of the displacement detection signal and generates said deviation signal; and said servo characteristic changing means includes displacement detection signal corresponding characteristic changing means for detecting an excess of the value of the deviation signal over a predetermined value, and changing the predetermined response characteristic to the deviation signal, possessed by the drive signal generated from said control means in response to the excess being detected, to a faster response characteristic.

14. The servo circuit according to claim 13, wherein said control means includes:

integrator means for integrating the deviation signal output from said deviation detection means and generating an integral control signal;

inverting amplifier means for inverting-amplifying the deviation signal output from said deviation detecting means and generating a proportional control signal; and adder means for adding the integral control signal generated from said integrator means and the proportional control signal generated from said inverting amplifier means and generating the drive signal, and said displacement detection signal corresponding characteristic changing means includes an element having a current directional property connected in at least one of said integrator means an said inverting amplifier means.

15. The servo circuit according to claim 14, wherein said integrator means includes:
- an operational amplifier having an inverting input terminal for receiving the deviation signal from said deviation detecting means through a first resistor, a non-inverting input terminal connected to a reference voltage terminal, and an output terminal for supplying the integral control signal to said adder means; and
- a capacitor connected between the inverting input terminal and the output terminal of said operational amplifier, and
- said displacement detection signal corresponding characteristic changing means includes a series circuit formed of the element having the current directional property and a second resistor and connected in parallel to said first resistor, said element having the current directional property including a diode having an anode connected to one end of said first resistor to receive the deviation signal from said deviation detecting means, and a cathode connected to one end of said second resistor.

16. The servo circuit according to claim 14, wherein said inverting amplifier means includes:
- an operational amplifier having an inverting input terminal for receiving the deviation signal from said deviation detecting means through a first resistor, a non-inverting input terminal connected to a reference voltage terminal, and an output terminal for supplying the proportional control signal to said adder means;
- a capacitor connected between the inverting input terminal and the output terminal of said operational amplifier; and
- a second resistor connected in parallel to said capacitor, and
- said displacement detecting signal corresponding characteristic changing means includes a series circuit formed of the element having the current directional property and a third resistor and connected in parallel to said first resistor, said element having the current directional property including a diode having an anode connected to one end of said first resistor to receive the deviation signal from said deviation detecting means, and a cathode connected to one end of said third resistor.

17. The servo circuit according to claim 14, wherein said integrator means includes:
- a first operational amplifier having an inverting input terminal for receiving the deviation signal from said deviation detecting means through a first resistor, a non-inverting input terminal connected to a reference voltage terminal, and an output terminal for supplying the integral control signal to said adder means; and
- a first capacitor connected between the inverting input terminal and the output terminal of said first operational amplifier, said inverting amplifier means includes:
- a second operational amplifier having an inverting input terminal for receiving the deviation signal from said deviation detecting means through a second resistor, a non-inverting input terminal connected to the reference voltage terminal, and an output terminal for supplying the proportional control signal to said adder means;
- a second capacitor connected between the inverting input terminal and the output terminal of said second operational amplifier; and
- a third resistor connected in parallel to said second capacitor, and said displacement detection signal corresponding characteristic changing means includes:
- a first series circuit formed of a first diode serving as an element having the current directional property and a fourth resistor and connected in parallel to said first resistor, said first diode having an anode connected to one end of said first resistor to receive the deviation signal from said deviation detecting means and a cathode connected to one end of said fourth resistor; and
- a second series circuit formed of a second diode serving as an element having the current directional property and a fifth resistor and connected in parallel to said second resistor, said second diode having an anode connected to one end of said second resistor to receive the deviation signal from said deviation detecting means and a cathode connected to one end of said fifth resistor.

18. The servo circuit according to claim 14, wherein said integrator means includes:
- a save deviation signal generator means for generating an amplification deviation signal by amplifying the deviation signal from said deviation detecting means with a programmable gain, and generating a save deviation signal by differentially amplifying the deviation signal and a reference signal with a programmable gain;
- an operational amplifier having an inverting input terminal for receiving the amplification deviation signal from said save deviation signal generator means through a first resistor, a non-inverting input terminal connected to a reference voltage terminal, and an output terminal for supplying the integral control signal to said adder means; and
- a capacitor connected between the inverting input terminal and the output terminal of said operational amplifier, and said displacement detecting signal corresponding characteristic changing means includes:
- a diode having an anode and a cathode and serving as an element having the current directional property, said anode being connected to said save deviation signal generator means to receive the save deviation signal therefrom; and
- a second resistor whose one end is connected to the cathode of said diode and whose other end is connected to the non-inverting input terminal of said operational amplifier.

19. The servo circuit according to claim 14, wherein said inverting amplifier means includes:
- a save deviation signal generator means for generating an amplification deviation signal by amplifying the deviation signal from said deviation detecting means with a programmable gain, and generating a save deviation signal by differentially amplifying the deviation signal and a reference signal with a programmable gain;
- an operational amplifier having an inverting input terminal for receiving the amplification deviation signal from said save deviation signal generator means through a first resistor, a non-inverting input terminal connected to a reference voltage terminal, and an output terminal for supplying the proportional control signal to said adder means;

a capacitor connected between the inverting input terminal and the output terminal of said operational amplifier; and a second resistor connected in parallel to said capacitor, and said displacement detection signal corresponding characteristic changing means includes:

a diode having an anode and a cathode and serving as an element having the current directional property, said anode being connected to said save deviation signal generator means to receive the save deviation signal therefrom; and a third resistor whose one end is connected to the cathode of said diode and whose other end is connected to the non-inverting input terminal of said operational amplifier.

20. The servo circuit according to claim 14, wherein the integrator means includes:

first save deviation signal generator means for generating a first amplification deviation signal by amplifying the deviation signal from said deviation detecting means with a programmable gain, and generating a first save deviation signal by differentially amplifying the deviation signal and a first reference signal with a programmable gain;

a first operational amplifier having an inverting input terminal for receiving the first amplification deviation signal from said first save deviation signal generator means through a first resistor, a non-inverting input terminal connected to a reference voltage terminal, and an output terminal for supplying the integral control signal to said adder means; and a first capacitor connected between the inverting input terminal and the output terminal of said first operational amplifier, said inverting amplifier means includes:

second save deviation signal generator means for generating a second amplification deviation signal by amplifying the deviation signal from said deviation detecting means with a programmable gain, and generating a second save deviation signal by differentially amplifying the deviation signal and a second reference signal with a programmable gain;

a second operational amplifier having an inverting input terminal for receiving the second amplification deviation signal from said second save deviation signal generator means through a second resistor, a non-inverting input terminal connected to the reference voltage terminal, and an output terminal for supplying the proportional control signal to said adder means;

a second capacitor connected between the inverting input terminal and the output terminal of said second operational amplifier; and a third resistor connected in parallel to said second capacitor, and said displacement detection signal corresponding characteristic changing means includes:

a first diode having an anode and a cathode and serving as an element having the current directional property, said anode being connected to said first save deviation signal generator means to receive the first save deviation signal therefrom;

a fourth resistor whose one end is connected to the cathode of said first diode and whose other end is connected to the non-inverting input terminal of said first operational amplifier;

a second diode having an anode and a cathode and serving as an element having the current directional property, said anode being connected to said second save deviation signal generator means to receive the second save deviation signal therefrom; and a fifth resistor whose one end is connected to the cathode of said second diode and whose other end is connected to the non-inverting input terminal of said second operational amplifier.

21. The servo circuit according to claim 13, wherein said control means includes:

integrator means for integrating the deviation signal output from said deviation detection means and generating an integral control signal;

inverting amplifier means for inverting-amplifying the deviation signal output from said deviation detecting means and generating a proportional control signal; and adder means for adding the integral control signal generated from said integrator means and the proportional control signal generated from said inverting amplifier means and generating the drive signal, said integrator means includes:

save deviation signal generator means for generating an amplification deviation signal by amplifying the deviation signal from said deviation detecting means with a programmable gain, and generating a save deviation signal by differentially amplifying the deviation signal and a reference signal with a programmable gain;

an operational amplifier having an inverting input terminal for receiving the amplification deviation signal from said save deviation signal generator means through a first resistor, a non-inverting input terminal connected to a reference voltage terminal, and an output terminal for supplying the integral control signal to said adder means; and a capacitor connected between the inverting input terminal and the output terminal of said operational amplifier, and said displacement detection signal corresponding characteristic changing means includes:

half-wave rectifier means for half-wave-rectifying the save deviation signal generated from said save deviation signal generator means and generating a rectified save deviation signal; and a second resistor connected between said half-wave rectifier means and the non-inverting input terminal of said operational amplifier.

22. The servo circuit according to claim 13, wherein said control means includes:

integrator means for integrating the deviation signal output from said deviation detection means and generating an integral control signal;

inverting amplifier means for inverting-amplifying the deviation signal output from said deviation detecting means and generating a proportional control signal; and adder means for adding the integral control signal generated from said integrator means and the proportional control signal generated from said inverting amplifier means and generating the drive signal, said inverting amplifier means includes:

save deviation signal generator means for generating an amplification deviation signal by amplifying the deviation signal from said deviation detecting means with a programmable gain, and generating a save deviation signal by differentially amplifying the deviation signal and a reference signal with a programmable gain;

an operational amplifier having an inverting input terminal for receiving the amplification deviation signal from said save deviation signal generator means through a first resistor, a non-inverting input terminal connected to a reference voltage terminal, and an output terminal for supplying the proportional control signal to said adder means;

a capacitor connected between the inverting input terminal and the output terminal of said operational amplifier; and a second resistor connected in parallel to said capacitor, and said displacement detection signal corresponding characteristic changing means includes:

half-wave rectifier means for half-wave-rectifying the save deviation signal generated from said save deviation signal generator means and generating a rectified save deviation signal; and a third resistor connected between said half-wave rectifier means and the non-inverting input terminal of said operational amplifier.

23. The servo circuit according to claim 13, wherein said control means includes:

integrator means for integrating the deviation signal output from said deviation detection means and generating an integral control signal;

inverting amplifier means for inverting-amplifying the deviation signal output from said deviation detecting means and generating a proportional control signal; and adder means for adding the integral control signal generated from said integrator means and the proportional control signal generated from said inverting amplifier means and generating the drive signal, said integrator means includes:

first save deviation signal generator means for generating a first amplification deviation signal by amplifying the deviation signal from said deviation detecting means with a programmable gain, and generating a first save deviation signal by differentially amplifying the deviation signal and a first reference signal with a programmable gain;

a first operational amplifier having an inverting input terminal for receiving the first amplification deviation signal from said first save deviation signal generator means through a first resistor, a non-inverting input terminal connected to a reference voltage terminal, and an output terminal for supplying the integral control signal to said adder means; and a first capacitor connected between the inverting input terminal and the output terminal of said first operational amplifier, said inverting amplifier means includes:

second save deviation signal generator means for generating a second amplification deviation signal by amplifying the deviation signal from said deviation detecting means with a programmable gain, and generating a second save deviation signal by differentially amplifying the deviation signal and a second reference signal with a programmable gain;

a second operational amplifier having an inverting input terminal for receiving the second amplification deviation signal from said second save deviation signal generator means through a second resistor, a non-inverting input terminal connected to the reference voltage terminal, and an output terminal for supplying the proportional control signal to said adder means;

a second capacitor connected between the inverting input terminal and the output terminal of said second operational amplifier; and a third resistor connected in parallel to said second capacitor, and said displacement detection signal corresponding characteristic changing means includes:

first half-wave rectifier means for half-wave-rectifying the first save deviation signal generated from said first save deviation signal generator means and generating a first rectified save deviation signal;

a fourth resistor connected between said first half-wave rectifier means and the non-inverting input terminal of said first operational amplifier;

second half-wave rectifier means for half-wave-rectifying the second save deviation signal generated from said second save deviation signal generator means and generating a second rectified save deviation signal; and a fifth resistor connected between said second half-wave rectifier means and the non-inverting input terminal of said second operational amplifier.

* * * * *